J. FOX.
DRILL CHUCK.
No. 27,044.        Patented Feb. 7, 1860.
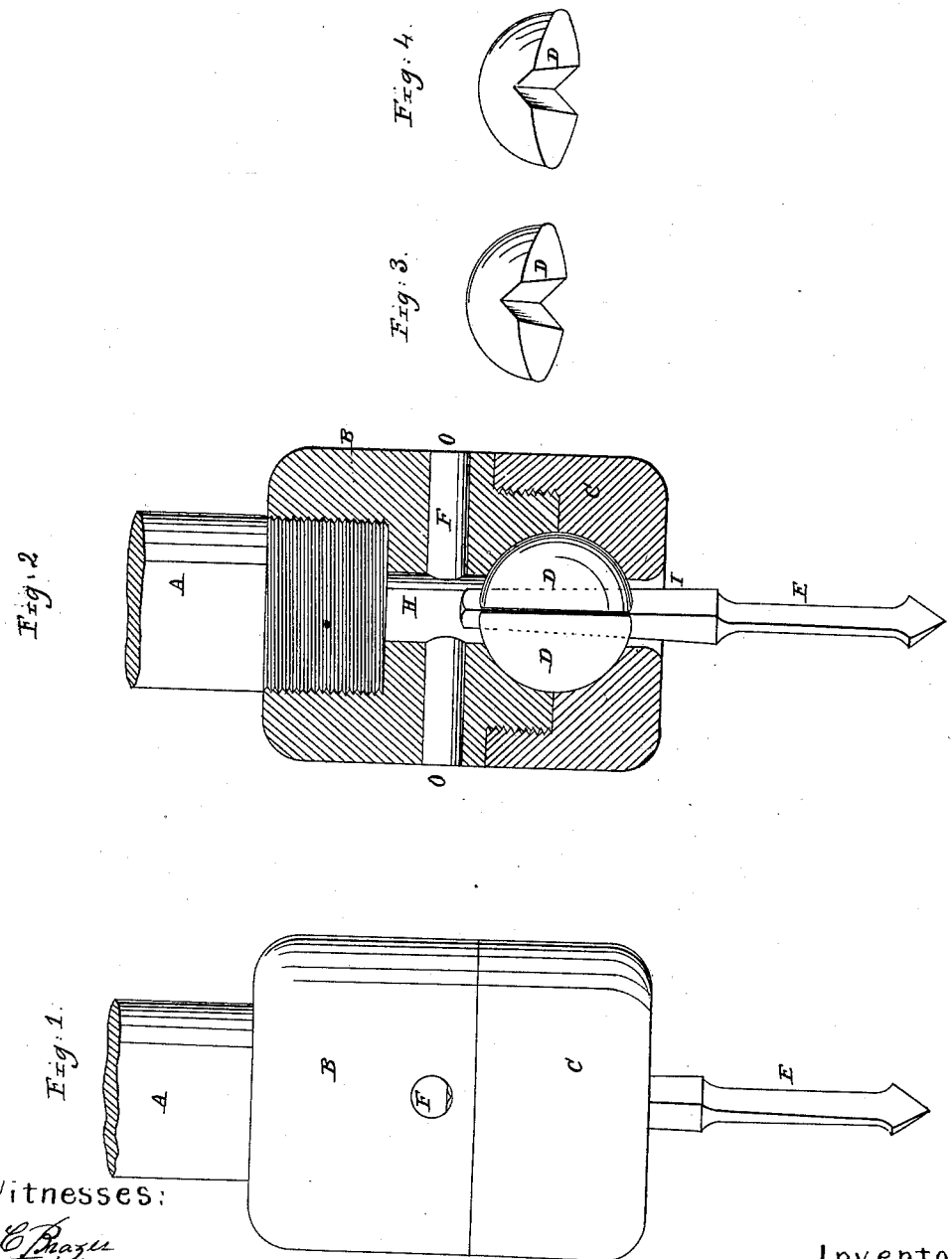
Witnesses:
*E. Frazer*
*James M. Egbert*
Inventor:
*Jacob Fox*

UNITED STATES PATENT OFFICE.

JACOB FOX, OF PHILADELPHIA, PENNSYLVANIA.

DRILL-CHUCK.

Specification of Letters Patent No. 27,044, dated February 7, 1860.

*To all whom it may concern:*

Be it known that I, JACOB FOX, of Philadelphia, in the county of Philadelphia and State of Pennsylvania, have invented a new and improved drill-chuck for boring or drilling holes into wood or metal, whereby the point of the drill will adjust itself and run perfectly true with the spindle to which the chuck is fastened; and I do hereby declare that the following is a full, clear, and exact description of the construction and operation of the same, reference being had to the annexed drawings.

Figure 1 is an inclosed view of the chuck. Fig. 2 is a cross section. Figs. 3 and 4 are views of the divided ball.

A is a section of the spindle of the lathe or drillpress to which the chuck is attached. B top section of the chuck that screws on the spindle. C the cap which screws on to section B. D D the ball with a square hole in it, divided in halves running from H to I. E a drill with a square shank, the shank of drill is taper.

The chuck B is screwed on to spindle A as seen in Fig. 2, at K. The lower portion of chuck has a screw on it to which cap C is screwed, and is rounded out to a half circle to receive the divided ball D, D. The cap C is also rounded out to half a circle that when the cap C is screwed on to B the two will form a hollow sphere in which the divided ball D D fits merely tight enough that the ball D, D, can be moved without binding against the sides.

There is a hole in the cap C and chuck B larger than the square of the drill as seen at H and I so that the drill in finding its center does not touch the sides of the chuck. There is a hole in the chuck running from O to O for driving out the drill.

The divided ball has a square hole in it passing through its center from H to I, one half of the square in one part of the ball D and one half in the other, as seen in Fig. 2 to receive the drill E. The drill shank must not necessarily be square, the ball may also be divided into two or more parts, the drill shank may be round and tapering but square is best.

Operation and use: Screw or fasten the chuck on the spindle of the drillpress or lathe in any of the usual forms; then take a drill and insert the square tapered shank into the divided ball merely tight enough that the drill will not fall out; then take a piece of iron with a center in it, lay it on the table of the drill press, bring the spindle of the press A down or forward as the case may be, till the point of the drill E enters the center in the piece of iron; then put the spindle in motion; bring the spindle wheel in motion, hard down to tighten the drill in the divided ball D D. If the point of drill is not in a center line with the revolving spindle when the machine is put in motion it will immediately become so before the shank of the drill will tighten the divided ball D D against the sides of hollow sphere in chuck B and cap C, and when tight will run perfectly true with the center of the spindle A, thereby making a better hole and less liability of the drill breaking and easier on the press or lathe itself, independent of the time which is requisite in straightening drills when used in the usual manner.

This chuck may be used for turning as well as drilling.

I claim—

A ball divided in two or more parts with a taper hole passing through its center, in combination with a tapered drill shank or spindle, substantially as specified for the purpose set forth.

JACOB FOX.

Witnesses:
C. BRAZER,
JAMES M. EGBERT.